(12) United States Patent
Schneider et al.

(10) Patent No.: US 10,615,736 B2
(45) Date of Patent: Apr. 7, 2020

(54) TEMPERATURE MONITORING

(71) Applicant: ebm-papst Mulfingen GmbH & Co. KG, Mulfingen (DE)

(72) Inventors: Fabian Schneider, Rot am See (DE); Sebastian Schroth, Kupferzell (DE); Marco Weckert, Dörzbach-Hohebach (DE); Ralph Wystup, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 16/084,897

(22) PCT Filed: Apr. 3, 2017

(86) PCT No.: PCT/EP2017/057834
§ 371 (c)(1),
(2) Date: Sep. 13, 2018

(87) PCT Pub. No.: WO2017/174495
PCT Pub. Date: Oct. 12, 2017

(65) Prior Publication Data
US 2019/0089291 A1    Mar. 21, 2019

(30) Foreign Application Priority Data

Apr. 8, 2016   (DE) .................. 10 2016 106 431

(51) Int. Cl.
*H02P 29/64*   (2016.01)
*H02H 1/00*   (2006.01)
(Continued)

(52) U.S. Cl.
CPC ............... *H02P 29/64* (2016.02); *G01K 7/16* (2013.01); *G01K 7/34* (2013.01); *H02H 1/003* (2013.01);
(Continued)

(58) Field of Classification Search
CPC ...................................................... H02P 29/64
(Continued)

(56) References Cited

U.S. PATENT DOCUMENTS 4,472,666 A * 9/1984 Akeda ................. H02H 7/0833
318/400.08
7,129,660 B2 * 10/2006 Fujita ..................... H02P 23/14
318/434

(Continued)

FOREIGN PATENT DOCUMENTS

DE   10 2011 0842999 A1   4/2013
EP    1 858 131 A2   11/2007

OTHER PUBLICATIONS

International Search Report for International Application No. PCT/EP2017/057834, dated Jun. 26, 2017, 3 pgs.

*Primary Examiner* — David Luo
(74) *Attorney, Agent, or Firm* — Dickinson Wright PLLC

(57) ABSTRACT

The present disclosure relates to an electronic circuit for detecting the current winding temperature of phase windings and/or other characteristics of an electronically commutated electric motor, which is connected, or can be connected, to a frequency converter, comprising one or more capacitive two-terminal networks with a temperature-dependent impedance, each network being arranged parallel to two winding terminals (u, v, w) of the phase windings, as well as a detector for detecting the current responses in the motor feeds on the basis of steep-flanked voltage changes at the output of the frequency converter.

18 Claims, 3 Drawing Sheets

(51) Int. Cl.
*H02H 7/08* (2006.01)
*H02H 7/085* (2006.01)
*G01K 7/16* (2006.01)
*G01K 7/34* (2006.01)

(52) U.S. Cl.
CPC ........ *H02H 7/0833* (2013.01); *H02H 7/0852* (2013.01); *G01K 2217/00* (2013.01)

(58) Field of Classification Search
USPC .......................................... 318/473, 471, 445
See application file for complete search history.

(56) References Cited

U.S. PATENT DOCUMENTS

| | | | |
|---|---|---|---|
| 8,040,087 B2 * | 10/2011 | Hsu ........................... | H02P 6/16 318/400.01 |
| 2014/0210394 A1 | 7/2014 | Kuehnhoefer et al. | |
| 2015/0381090 A1 | 12/2015 | Henderson et al. | |

\* cited by examiner

TEMPERATURE MONITORING

RELATED APPLICATIONS

This application claims priority to and the benefit of German Patent Application No. 10 2016 106 431.9, filed on Apr. 8, 2016, and PCT/EP2017/057834, filed Apr. 3, 2017, the contents of which are incorporated herein by reference in their entirety.

FIELD

The present disclosure relates to a circuit and a method for monitoring the temperature and other characteristics of the winding lines of an EC motor.

BACKGROUND

In the prior art circuits are known for the thermal protection and for the power regulating as a function of a current winding temperature of phase windings of an electric motor. Traditional circuits comprise on the one hand a temperature monitor switch measuring the winding temperature of the phase windings, which upon reaching a certain winding temperature, the switching temperature, produces a switching off of a winding current flowing through the windings, as well as a temperature-dependent resistor associated with the phase windings, which upon reaching a certain winding temperature brings about, for example, a reduction in the motor power due to a resulting rise in the resistance.

From the documents DE 10 2013 107 819 A1, EP 1 303 021 A2 and EP 2184830 A1 there are known for example a circuit for the thermal protection and power regulation in dependence on a current winding temperature of phase windings of an electric motor.

As is known, the protection of a three-phase electric motor against thermal overload is accomplished by three temperature monitor switches.

The temperature of each motor phase is sensed by its own temperature monitor, in order to also detect asymmetrical temperature rises, e.g., due to a winding insulation fault. The three temperature monitor switches are connected in series. Upon exceedance of the switching temperature of one of the temperature monitor switches, the switch opens. The interruption is detected in an evaluation electronics and the necessary action for the particular protection concept is triggered.

Based on the assumption that, given proper functioning of the motor, the temperatures in the three winding phases are approximately equal, typically only one temperature-dependent resistance is used in order to reduce costs. In order to evaluate the series circuit of the three temperature monitor switches by an evaluation electronics, two connections are needed in the signal electronics. Likewise, for the evaluation of the temperature-dependent resistance by the evaluation electronics, two connections to the electronics are needed. Thus, on the whole, four connections are needed between the electric motor and the evaluation electronics. This results in a higher circuitry and componentry expense.

In traditional motor circuits, accordingly, either a temperature monitor/switch (digital) or a temperature sensor (analog) introduced directly in the motor winding is used to limit the winding temperature. This usually makes contact with two connection elements (contacts, lines) led out from the motor in addition to the three winding terminals.

A digitally operating temperature monitor/switch may also be integrated directly in series with the winding phases in the power pathway. In the former case, the opening of the temperature monitor at excessive motor temperature or the passing of a limit temperature of the analog sensor is detected by the electronics and the motor current is interrupted in this way. This has the drawback, among others, that two additional connection elements are required for the detection between motor and electronics, as well as an additional evaluation circuit in the electronics.

In the second case, the direct switching off at excess temperature occurs by the direct disconnection of the winding phases from the electronics by means of the temperature monitor itself. While this solution requires no additional lines, the temperature monitor must be designed for the secure disconnecting of the entire motor current (even during excess current). Moreover, one drawback is that the monitor must carry the entire motor current during normal operation.

BRIEF SUMMARY

The present disclosure therefore proposes to solve the problem of overcoming the mentioned drawbacks and providing an improved circuit as well as a method with which the monitoring of winding lines and especially the temperature is possible in a simple and reliable manner, without additional lines and/or switching elements being required in the winding lines.

This problem is solved by the combination of features according to patent claim 1 and patent claim 8.

A basic notion of the present disclosure is that the three available winding terminals of the machine are used for the detection of the motor temperature and monitoring of the temperature for the electronics. Moreover, an excess current detection or current detecting device should be used as the detection mechanism for detection the temperature or other characteristics of phase windings. Since such a current detecting device is usually present in EC motors and their converters or their commutation electronics, it makes sense to incorporate this in the concept of the present disclosure. The temperature monitoring or monitoring of the characteristics of phase windings is achieved by means of a response function as a response to a specific measurement signal (exciting signal).

According to the present disclosure, therefore, an electronic circuit is proposed for detecting the current winding temperature of phase windings and/or other characteristics of an electronically commutated electric motor, which is connected, or can be connected, to a frequency converter, comprising one or more capacitive two-terminal networks with a temperature-dependent impedance, each network being arranged parallel to two winding terminals of the phase windings, as well as a detector for detecting the current responses in the phase windings on the basis of steep-flanked voltage changes of the frequency converter.

It is especially advantageous when a current detecting device of the converter or a motor control unit is used as the current detecting device to which the motor is connected.

In one preferred embodiment of the present disclosure, moreover, a signal evaluating device is provided, which is connected to the detector.

According to the present disclosure, the capacitive two-terminal networks are arranged between the respectively monitored phase windings. Steep-flanked voltage changes generate pulse-frequency current peaks at capacitive elements, which can be detected by the current detecting device on the electronics. According to the present disclosure, therefore, the exciting signal used is the clocked operation (such as pulse width modulation) with its steep-flanked voltage swings at the motor terminals which is used in the converter for the regulating of the motor. From the response function, inferences may be drawn directly in the current detecting device by means of a signal analysis as to the characteristics of the phase windings, and thus also their temperature. It is moreover advantageous to save reference curves, for example, on the current response functions for a permissible nominal range of characteristics being detected, such as the temperature, so that it can be detected by a manual or even better an automated comparison between actual current data of the response function and nominal data whether a normal motor operation is at hand and for example whether the motor temperature lies below a limit value in the normal range.

In the above-described manner, the frequency excitation of the converter is used for the information evaluation. According to the present disclosure, therefore, additional circuit parts in the converter or the electronics are not needed for the detection of the excess motor temperature or the characteristics of the phase windings.

It is especially advantageous when each two-terminal network is placed in parallel with two winding leads of the motor windings, wherein the two-terminal network is designed as a two-terminal network with a temperature-dependent impedance.

In this way, the motor temperature may be detected indirectly by the pulse-frequency or high-frequency current response excited by the pulse width modulation of the converter.

In one advantageous embodiment of the present disclosure it is therefore proposed that the temperature of the phase windings or other characteristics of the motor are determined from the response function in the current detecting device by means of a signal analysis of the signal evaluating device.

For example, in this case the amplitude, phase or form may either be evaluated digitally (excess temperature yes/no) or in analog manner with corresponding information on the temperature value. A transmission of other information as characteristics of the motor (such as several temperatures, rotational speeds, parameters and the like) is also possible by the specific modulation of the impedance of the two-terminal network by means of an active switching in both analog and digital manner (e.g., as a serial data stream).

Therefore, an active switching is provided for the modulation of the impedance of the two-terminal networks, in order to obtain from either the amplitude, the phase, or the form of the corresponding response function the characteristics to be determined for the motor or the temperature of the phase windings.

Another aspect of the present disclosure relates to a method for detecting the current winding temperature and/or other characteristics of an electronically commutated electric motor making use of an electronic circuit as described previously, with the following steps:
  operating a motor at a frequency converter and
  detecting the current responses in the phase windings on the basis of the steep-flanked voltage changes at the output of the frequency converter by means of the detector of the circuit as a response signal to an exciting signal.

The method may be advantageously further characterized in that the clocked operation (such as pulse width modulation) with its steep-flanked voltage swings at the motor terminals which is used in the converter for the regulating of the motor is utilized as the exciting signal.

Other advantageous modifications of the present disclosure are characterized in the dependent claims and shall be presented more closely below, together with the description of the preferred embodiment of the present disclosure with the aid of the figures.

BRIEF DESCRIPTION OF THE DRAWINGS

There are shown.

DETAILED DESCRIPTION

In the following, the present disclosure shall be described more closely with the aid of FIGS. 1 to 5, where the same reference numbers refer to the same functional and/or structural features.

Figure 1:
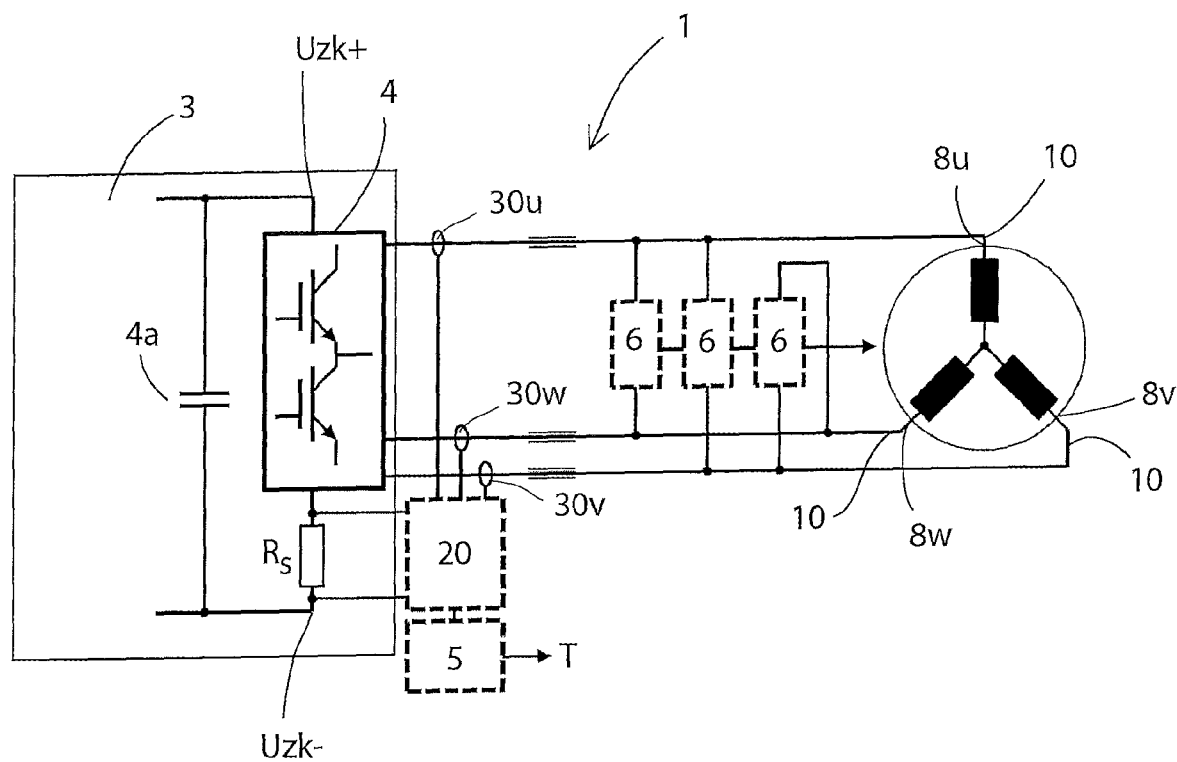
FIG. 1 a sample embodiment of an electronic circuit according to the present disclosure,
FIG. 2a-f sample embodiments of two-terminal networks with variable impedance,
FIG. 3 another sample embodiment of a two-terminal network with specifically controllable impedance,
FIG. 4 another sample embodiment with a parameter dependency, and
FIG. 5 current response in the sum current, measured at the intermediate circuit shunt resistance Rs and in the motor phase currents, measured at the measurement points $30u$, $30v$ and $30w$.
Figures 2A, 2B, 2C, 2D:
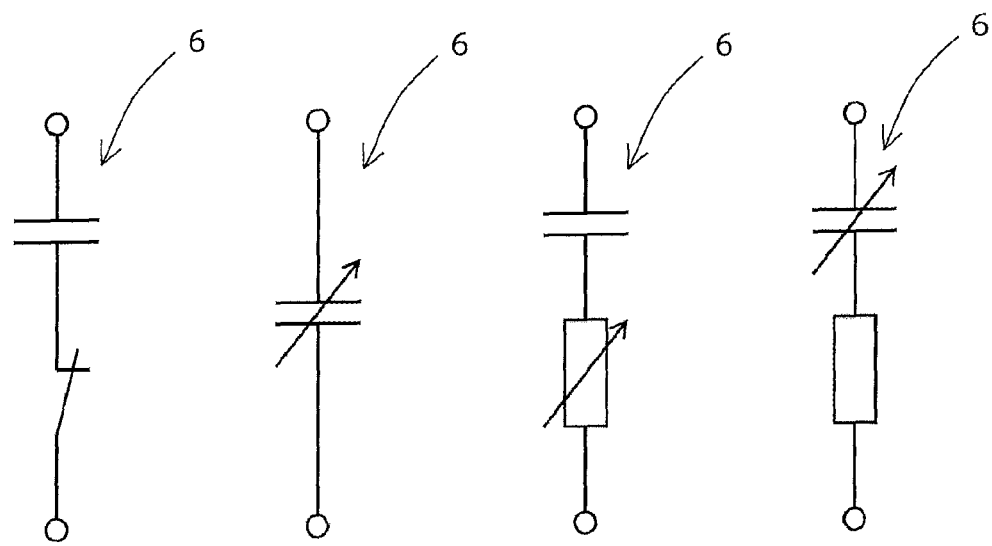
Figure 2E:
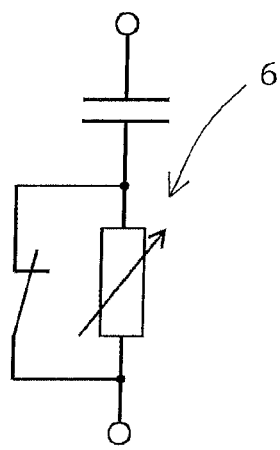
Figure 2F:
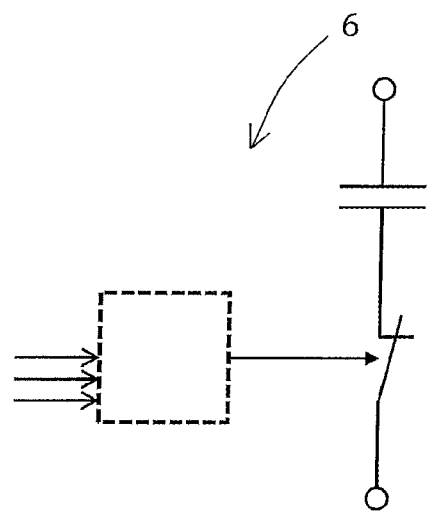
Figure 3:
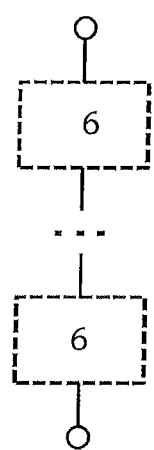

FIG. 1 shows a sample embodiment of an electronic circuit 1 according to the present disclosure with three two-terminal networks for temperature detection incorporated at the motor side. This electronic circuit 1 serves for the detecting of the current winding temperature of the phase windings 10 of the electronically commutated electric motor 2, which is connected across a schematically represented frequency converter 3 to an intermediate circuit potential. Three capacitive two-terminal networks 6 are shown with a temperature-dependent impedance, each of which is arranged in parallel with two winding terminals $8u$, $8v$, $8w$ of the phase windings 10. Moreover, a detector 20 is provided, namely a current detecting device 20 for detecting the current responses in the motor feeds 30 on the basis of steep-flanked voltage changes at the output of the frequency converter 3.

In this embodiment, the detecting of the high-frequency current responses may occur directly via one or more motor phase currents and/or one to three preferably low-ohm shunt resistors Rs hooked up in the connection of the low side switch to the negative terminal Uzk− of the intermediate circuit.

Moreover, a signal evaluating device 5 is connected to the current detecting device 20. By analysis of the current responses, the winding temperature or in general information modulated to the impedance may be recovered from the current responses.

FIGS. 2a-2f show alternative embodiments of the two-terminal networks 6 with variable impedance represented in FIG. 1. Any given combination forms of the represented variants of the two-terminal networks 6 are also possible, as shown schematically in FIG. 3. Depending on the characteristics of the two-terminal networks 6, the form, amplitude or variation of the current response functions will vary, so that these should be selected in dependence on the specifically used two-terminal networks 6 by means of the signal evaluating device 5 in accordance with the suitable analysis or reference.

Figure 4:
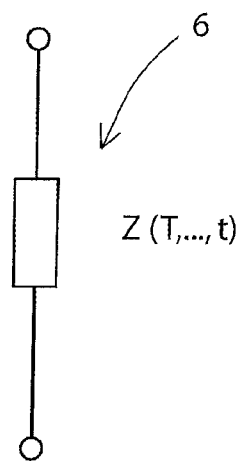

FIG. 4 represents a quite general embodiment of a two-terminal network, having a specific control or parameter dependency of the impedance. The parameter dependency of the impedance, such as an impedance dependency on the temperature of the phase windings, can be extracted immediately from the response functions by suitable analysis for the determining of the temperature.

Figure 5:
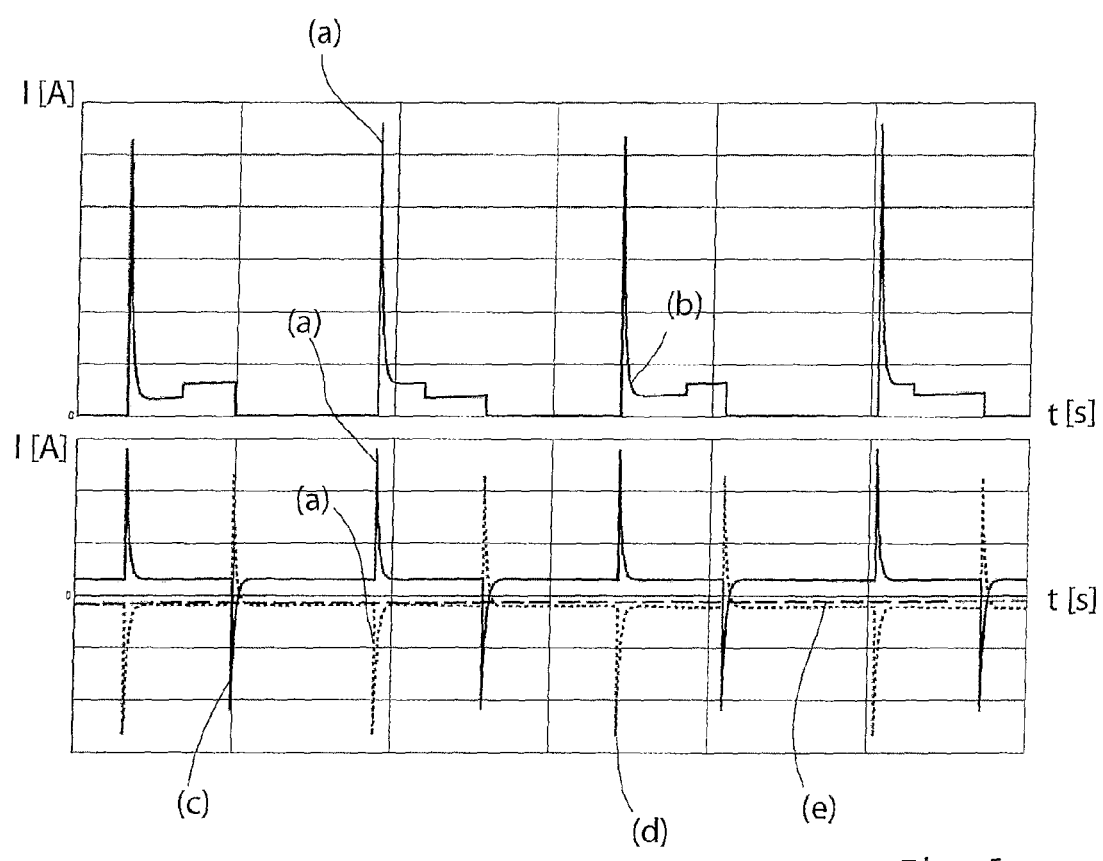

FIG. 5 shows for example the current responses in the sum current, measured at the intermediate circuit shunt resistor Rs (top) and in the motor phase currents measured at the measurement points 30u, 30v and 30w (bottom). The current peaks contained therein are analyzed and provide the information about the winding temperature or other characteristics of the motor. The information may, for example, be obtained by analysis of the amplitude or form of the current peaks modulated to the operating current of the motor. In the simplest case, this can be an excess current detector (comparator), which detects the occurrence of peaks substantially exceeding the operating current in their amplitude and thus signals an overheating of the winding and triggers a disconnection.

The curves (a) here shows the respective current response (current peaks) produced by the capacitive two-terminal network 6 between the terminals 8u and 8v. curve (b) shows the sum current at the shunt resistor Rs, the diagram representing 2 periods of the PWM modulation of the frequency converter.

The lower solid curve (c) represents the phase current at the measurement point 30u. The lower dotted curve (d) represents the phase current at the measurement point 30v and the lower dashed curve (e) represents the phase current at the measurement point 30w.

The present disclosure is not limited in its embodiment to the preferred sample embodiments given above. Instead, a number of variants are conceivable, which make use of the represented solution even in fundamentally different kinds of embodiment.

The invention claimed is:

1. An electronic circuit for detecting the current winding temperature of phase windings or other characteristics of an electronically commutated electric motor, which is configured to connect to a frequency converter, comprising one or more two-terminal networks with a temperature-dependent impedance, each network being arranged parallel to two winding terminals of the phase windings, and a detector for detecting the current responses in the motor feeds on the basis of steep-flanked voltage changes of the intermediate circuit voltage, wherein the detector is a current detecting device, and wherein one of a current detecting device of the converter and a motor control unit is provided as the current detecting device.

2. The electronic circuit as claimed in claim 1, wherein a signal evaluating device is connected to the detector.

3. The electronic circuit as claimed in claim 2, wherein the temperature of the phase windings or other characteristics of the motor are determined from the response function in the current detecting device by means of a signal analysis of the signal evaluating device.

4. The electronic circuit as claimed in claim 1, wherein the clocked operation with its steep-flanked voltage swings or voltage changes at the motor terminals which is used in the converter for the regulating of the motor is utilized as the exciting signal.

5. The electronic circuit as claimed in claim 4, wherein the temperature of the phase windings or other characteristics of the motor are determined from the response function in the current detecting device by means of a signal analysis of the signal evaluating device.

6. The electronic circuit as claimed in claim 1, wherein an active switching is provided for the modulation of the impedance of the two-terminal networks, in order to obtain from either the amplitude, the phase, or the form of the corresponding response function the characteristics to be determined for the motor or the temperature of the phase windings.

7. A method for detecting the current winding temperature or other characteristics of phase windings of an electronically commutated electric motor making use of an electronic circuit as claimed in claim 1, with the following steps:
   a. operating a motor at a frequency converter, and
   b. detecting the current responses in the phase windings on the basis of the steep-flanked voltage changes by means of the detector of the circuit as a response signal to a signal excited by the frequency converter), the excited signal being a high-frequency signal or a high-frequency and broad-band signal.

8. The method as claimed in claim 7, wherein the clocked operation with its steep-flanked voltage swings at the motor terminals which is used in the converter for the regulating of the motor is utilized as the exciting signal.

9. The method as claimed in claim 7, wherein the temperature or other characteristics are determined by means of a signal analysis of a signal evaluating device from the respective currently obtained response function.

10. The method as claimed in claim 7, wherein the exciting signal is a high-frequency signal.

11. The method as claimed in claim 7, wherein the exciting signal includes a high-frequency signal and broad-band signal.

12. An electronic circuit for detecting the current winding temperature of phase windings or other characteristics of an electronically commutated electric motor, which is configured to connect to a frequency converter, comprising one or more two-terminal networks with a temperature-dependent impedance, each network being arranged parallel to two winding terminals of the phase windings, and a detector for detecting the current responses in the motor feeds on the basis of steep-flanked voltage changes of the intermediate circuit voltage, wherein the clocked operation with its steep-flanked voltage swings or voltage changes at the motor terminals which is used in the converter for the regulating of the motor is utilized as the exciting signal.

13. The electronic circuit as claimed in claim 12, wherein an active switching is provided for the modulation of the impedance of the two-terminal networks, in order to obtain from either the amplitude, the phase, or the form of the corresponding response function the characteristics to be determined for the motor or the temperature of the phase windings.

14. The electronic circuit as claimed in claim 12, wherein the temperature of the phase windings or other characteristics of the motor are determined from the response function in the current detecting device by means of a signal analysis of the signal evaluating device.

15. The electronic circuit as claimed in claim 12, wherein a signal evaluating device is connected to the detector, and wherein the temperature of the phase windings or other characteristics of the motor are determined from the response function in the current detecting device by means of a signal analysis of the signal evaluating device.

16. A method for detecting the current winding temperature or other characteristics of phase windings of an electronically commutated electric motor making use of an electronic circuit as claimed in claim 12, with the following steps:

a. operating a motor at a frequency converter, and b. detecting the current responses in the phase windings on the basis of the steep-flanked voltage changes by means of the detector of the circuit as a response signal to a signal excited by the frequency converter), the excited signal being a high-frequency signal or a high-frequency and broad-band signal.

17. The electronic circuit as claimed in claim 12, wherein the detector is a current detecting device.

18. The electronic circuit as claimed in claim 17, wherein one of a current detecting device of the converter and a motor control unit is provided as the current detecting device.

\* \* \* \* \*